United States Patent
Freeman et al.

(10) Patent No.: US 10,612,399 B2
(45) Date of Patent: Apr. 7, 2020

(54) TURBINE VANE ASSEMBLY WITH CERAMIC MATRIX COMPOSITE COMPONENTS

(71) Applicants: Rolls-Royce North American Technologies Inc., Indianapolis, IN (US); Rolls-Royce Corporation, Indianapolis, IN (US)

(72) Inventors: Ted J. Freeman, Danville, IN (US); Aaron D. Sippel, Zionsville, IN (US); David J. Thomas, Brownsburg, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 98 days.

(21) Appl. No.: 15/995,369

(22) Filed: Jun. 1, 2018

(65) Prior Publication Data
US 2019/0368360 A1    Dec. 5, 2019

(51) Int. Cl.
*F01D 5/28* (2006.01)
*F01D 9/04* (2006.01)
*F01D 25/28* (2006.01)

(52) U.S. Cl.
CPC ............ *F01D 5/284* (2013.01); *F01D 9/041* (2013.01); *F01D 25/28* (2013.01); *F05D 2220/32* (2013.01); *F05D 2240/12* (2013.01); *F05D 2300/6033* (2013.01)

(58) Field of Classification Search
CPC .......... F01D 5/284; F01D 9/042; F01D 25/28; F05D 2260/31
See application file for complete search history.

(56) References Cited

U.S. PATENT DOCUMENTS

| | | | |
|---|---|---|---|
| 4,285,634 A | 8/1981 | Rossman et al. | |
| 4,314,794 A * | 2/1982 | Holden | F01D 5/182 416/225 |
| 4,326,835 A | 4/1982 | Wertz | |
| 4,645,421 A | 2/1987 | Huether | |
| 4,790,721 A | 12/1988 | Morris et al. | |
| 5,078,576 A | 1/1992 | Hayton | |
| 5,630,700 A * | 5/1997 | Olsen | F01D 5/189 415/134 |
| 7,452,189 B2 * | 11/2008 | Shi | F01D 5/147 415/200 |
| 8,015,705 B2 | 9/2011 | Wilson et al. | |
| 8,206,098 B2 * | 6/2012 | Prill | F01D 5/284 415/200 |
| 8,292,580 B2 * | 10/2012 | Schiavo | F01D 5/189 416/229 A |
| 8,475,132 B2 | 7/2013 | Zhang et al. | |
| 9,045,990 B2 | 6/2015 | Alvanos et al. | |
| 9,822,655 B2 | 11/2017 | Beaujard et al. | |

(Continued)

*Primary Examiner* — Ninh H. Nguyen
(74) *Attorney, Agent, or Firm* — Barnes & Thornburg LLP

(57) ABSTRACT

A turbine vane assembly adapted for use in a gas turbine engine includes an airfoil, an endwall, and a spar. The airfoil is shaped to interact with hot gases moving axially along a primary gas path of the gas turbine engine. The endwall is shaped to define a boundary of the primary gas path near a radial end of the airfoil. The spar is located in an interior region of the airfoil to carry loads that act on the airfoil during operation of the gas turbine engine.

19 Claims, 4 Drawing Sheets

(56) References Cited

U.S. PATENT DOCUMENTS

| | | |
|---|---|---|
| 9,970,307 B2* | 5/2018 | Kanjiyani ............... F01D 9/041 |
| 2014/0161623 A1 | 6/2014 | Zurmehly et al. |
| 2016/0123163 A1* | 5/2016 | Freeman ............... F01D 25/005 |
| | | 415/200 |
| 2017/0022833 A1 | 1/2017 | Heitman et al. |

* cited by examiner

TURBINE VANE ASSEMBLY WITH CERAMIC MATRIX COMPOSITE COMPONENTS

FIELD OF THE DISCLOSURE

The present disclosure relates generally to gas turbine engines, and more specifically to vanes used in gas turbine engines that include ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The integration of ceramic matrix composite materials into static vane assemblies is of interest because of the high-temperature capability of these materials. However, coupling ceramic matrix composite materials to other components included in gas turbine engines presents challenges based the mechanical characteristics of the various materials used (strength, coefficients of thermal expansion, etc.).

SUMMARY

The present disclosure may comprise one or more of the following features and combinations thereof.

A turbine vane assembly includes an airfoil comprising ceramic matrix composite materials, an endwall comprising ceramic matrix composite materials, and a spar comprising metallic materials. The airfoil is shaped to interact with hot gases moving axially along a primary gas path of the gas turbine engine relative to an axis. The airfoil is formed to include a radial-inner wall and a sidewall that extends radially outward and away from a perimeter of the radial-inner wall to define an interior region of the airfoil. The radial-inner wall is formed to define an airfoil passageway that extends radially through the radial-inner wall and opens into the interior region.

The endwall is shaped to define a boundary of the primary gas path near a radial end of the airfoil. The endwall is formed to define an end-wall passageway that extends radially through the endwall.

The spar is located in the interior region of the airfoil to carry loads that act on the airfoil. The spar includes a spar body, a spar tail, and a retainer. The spar body engages the radial-inner wall of the airfoil so that an interface between the spar and the airfoil is located radially inward toward the boundary of the primary gas path. The spar tail extends radially inward away from the spar body through the airfoil passageway and the end-wall passageway. The retainer may be coupled to the spar tail to block movement of the radial-inner wall and the endwall away from the spar body.

In some embodiments, the turbine vane assembly includes an inner panel. The inner panel may be arranged around the axis and may be adapted to block fluid communication between a pressurized region located axially upstream of the inner panel and a pressurized region located axially downstream of the inner panel. The inner panel may be coupled with the spar tail. The inner panel may be spaced apart radially from the spar body to locate the radial-inner wall and the endwall radially between the spar body and the inner panel.

In some embodiments, the inner panel is formed to define a panel passageway that extends through the inner panel. The spar tail may extend through the panel passageway such that a portion of the inner panel is located between the spar body and the retainer.

In some embodiments, the inner panel includes a body and a flange that extends radially outward away from the body. The flange may be formed to define a panel passageway that extends axially through the flange. The retainer may extend through the panel passageway to couple the inner panel with the spar tail.

In some embodiments, the spar tail extends radially inward through and beyond the endwall and the inner panel. In some embodiments, the turbine vane assembly includes an outer-endwall spaced apart radially from the endwall and shaped to define another boundary of the primary gas path near another radial end of the airfoil.

In some embodiments, the spar tail has threads and the retainer is threaded and mates with the threads of the spar tail. In some embodiments, the airfoil passageway is circular when viewed radially.

In some embodiments, the spar tail is formed to define a spar passageway that extends at least partway into the spar tail. The retainer may extend into the spar passageway.

According to another aspect of the present disclosure, a turbine vane assembly includes an airfoil, an endwall, and a spar. The airfoil includes a radial-inner wall and a sidewall. The radial-inner wall is formed to define an airfoil passageway that extends radially through the radial-inner wall relative to an axis. The sidewall extends radially away from the radial-inner wall to define an interior region of the airfoil. The endwall is formed to define an end-wall passageway that extends radially through the endwall. The spar includes a spar body located in the interior region of the airfoil and a spar tail that extends radially inward away from the spar body toward the axis and through the airfoil passageway and the end-wall passageway.

In some embodiments, the turbine vane assembly comprises an inner panel arranged at least partway around the axis and coupled with the spar tail. In some embodiments, the inner panel is spaced apart radially from the spar body to locate the radial-inner wall and the endwall radially between the spar body and the inner panel.

In some embodiments, the inner panel may be formed to define a panel passageway that extends through the inner panel. The spar tail may extend through and beyond the panel passageway.

In some embodiments, the inner panel includes a body arranged at least partway around the axis and a flange that extends radially outward away from the body. The flange may be formed to define a panel passageway that extends axially through the flange. The spar may further include a retainer that extends through the flange to couple the inner panel with the spar tail.

In some embodiments, the spar tail has threads. In some embodiments, the spar tail is formed to define a spar passageway that extends at least partway into the spar tail and the spar includes a retainer that extends into the spar passageway.

In some embodiments, the airfoil passageway is formed in the radial-inner wall of the airfoil at a predetermined location. The sidewall may be spaced apart from the spar body to define a gap therebetween. The spar tail may engage the radial-inner wall of the airfoil in the airfoil passageway such that at least a portion of aero loads acting on the airfoil are transmitted through the radial-inner wall at the predetermined location to the spar tail during use of the turbine vane assembly.

According to another aspect of the disclosure, a method may include a number of steps. The method may include providing an airfoil that comprises ceramic materials, a first endwall, and a spar that comprises metallic materials, the airfoil includes a radial-inner wall formed to define an airfoil passageway that extends radially through the radial-inner wall relative to an axis and a sidewall that extends radially away from the radial-inner wall to define an interior region of the airfoil, the first endwall formed to define an end-wall passageway that extends radially through the first endwall, and the spar includes a spar body and a spar tail that extends radially away from the spar body, locating the spar body in the interior region of the airfoil such that the spar tail extends through the airfoil passageway, and moving the endwall relative to the spar such that the spar tail extends through the end-wall passageway.

In some embodiments, the method further includes providing an inner panel and coupling the inner panel to the spar tail to locate the radial-inner wall and the first endwall radially between the spar body and a portion of the inner panel. In some embodiments, the method further includes providing a second endwall and locating the second endwall around a portion of the airfoil and in radial spaced apart relation relative to the first endwall.

These and other features of the present disclosure will become more apparent from the following description of the illustrative embodiments.

DETAILED DESCRIPTION OF THE DRAWINGS

Figure 1:
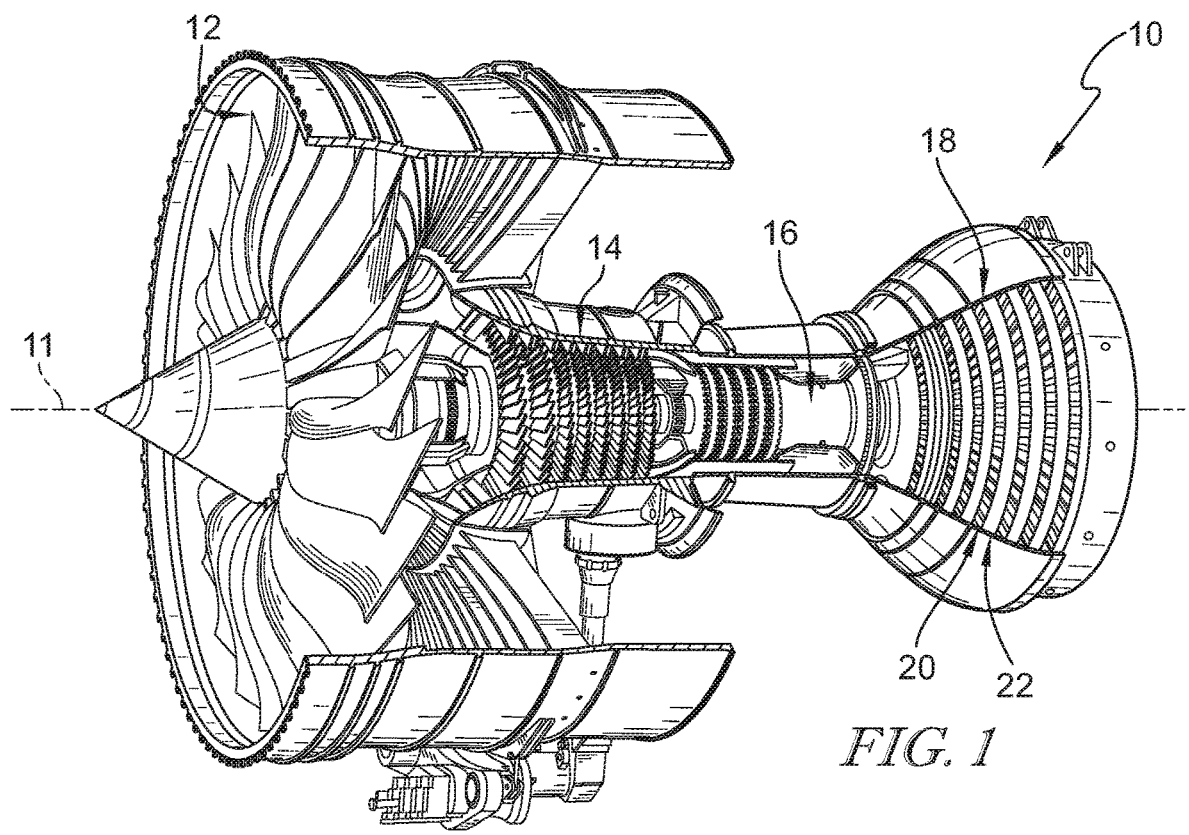
FIG. 1 is cutaway view of a gas turbine engine that includes a fan, a compressor, a combustor, and a turbine and the turbine includes a plurality of turbine wheels and turbine vane assemblies in accordance with the present disclosure and shown with further details in FIGS. 2 and 3.

For the purposes of promoting an understanding of the principles of the disclosure, reference will now be made to a number of illustrative embodiments illustrated in the drawings and specific language will be used to describe the same.

Figure 2:
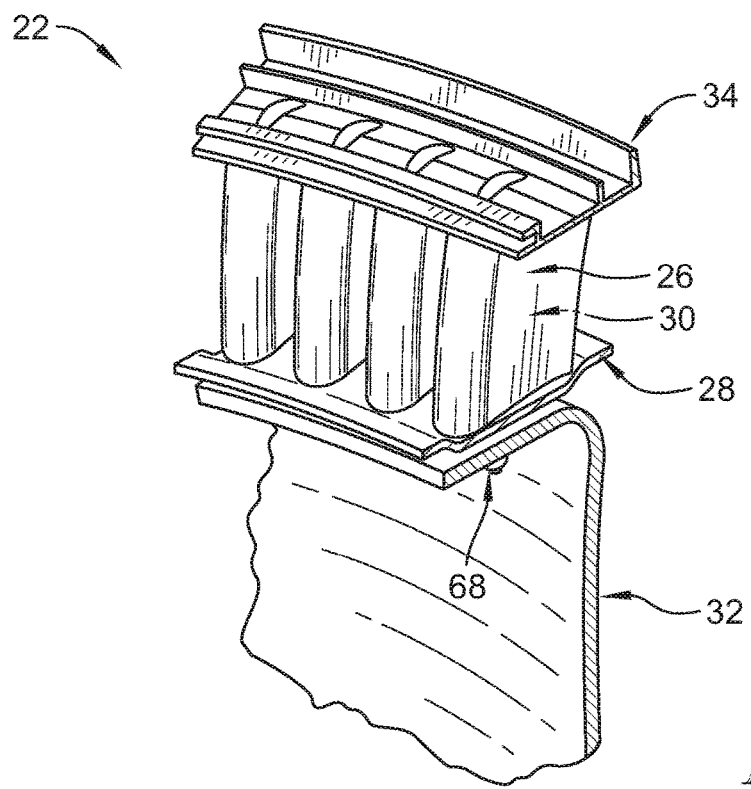
FIG. 2 is a perspective view of a portion of a turbine vane assembly included in the gas turbine engine of FIG. 1 showing that the turbine vane assembly includes a plurality of airfoils located radially between an outer endwall and an inner endwall and the airfoils are shaped to interact with hot gases moving axially along a primary gas path of the gas turbine engine.

A turbine vane assembly 22 is adapted for use in a gas turbine engine 10 as suggested in FIGS. 1 and 2. The gas turbine engine 10 includes a fan 12, a compressor 14, a combustor 16, and a turbine 18. The turbine vane assembly 22 is included in the turbine 18 and includes an airfoil 26, an inner endwall 28, and a spar 30. The airfoil 26 is shaped to interact with hot gases moving axially along a primary gas path of the gas turbine engine 10 relative to an axis 11. The inner endwall 28 is shaped to define a boundary of the primary gas path near a radial inner end of the airfoil 26. The spar 30 is located in an interior region 44 of the airfoil 26 to carry loads that act on the airfoil 26 during operation of the gas turbine engine 10.

Figure 3:
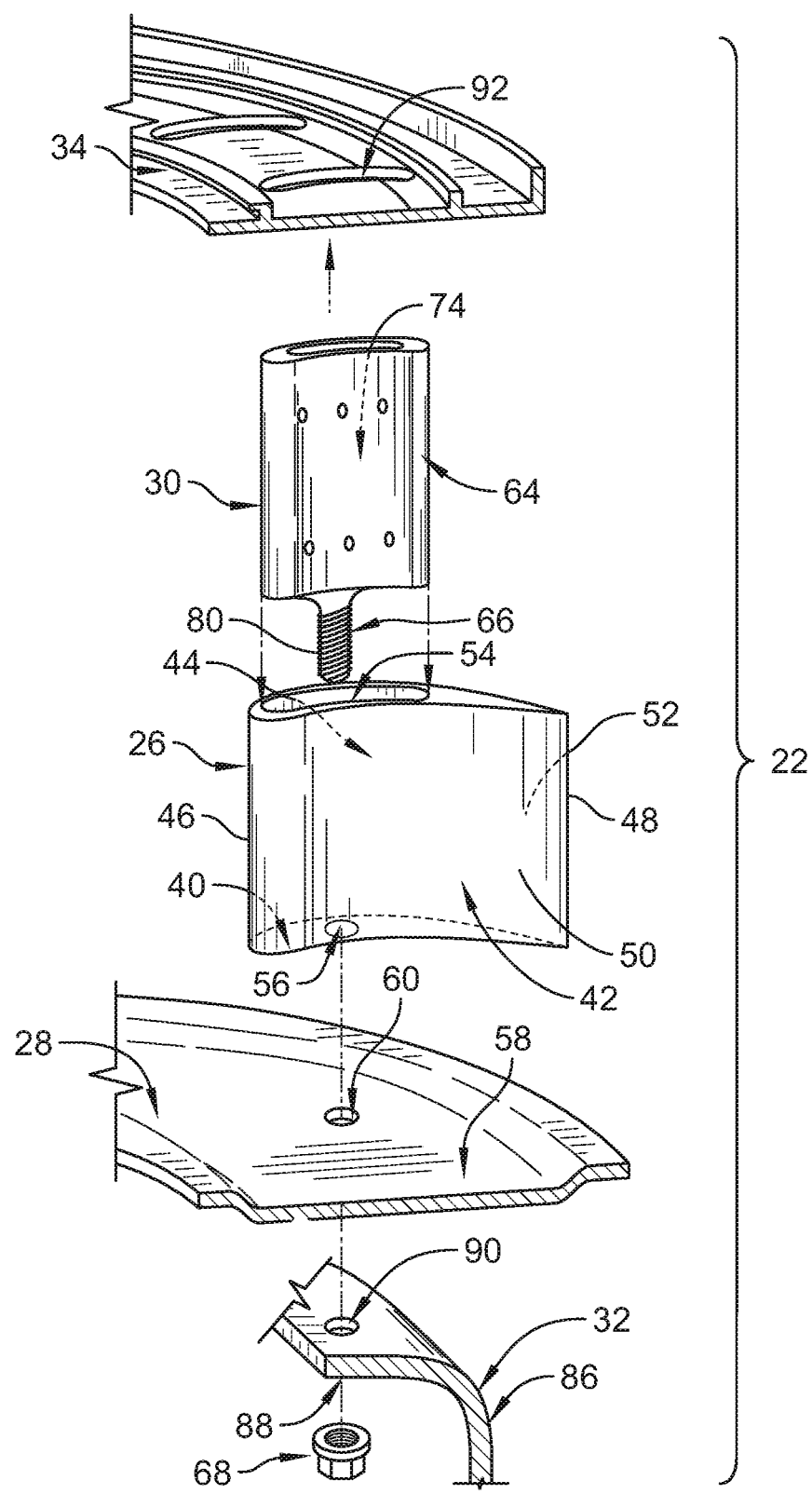
FIG. 3 is an exploded perspective assembly view of the turbine vane assembly of FIG. 2 showing that the turbine vane assembly includes the outer endwall, a spar, one of the airfoils shaped to include a radial-inner wall having a passageway formed therein and a sidewall, the inner endwall, and an inner panel.
Figure 4:
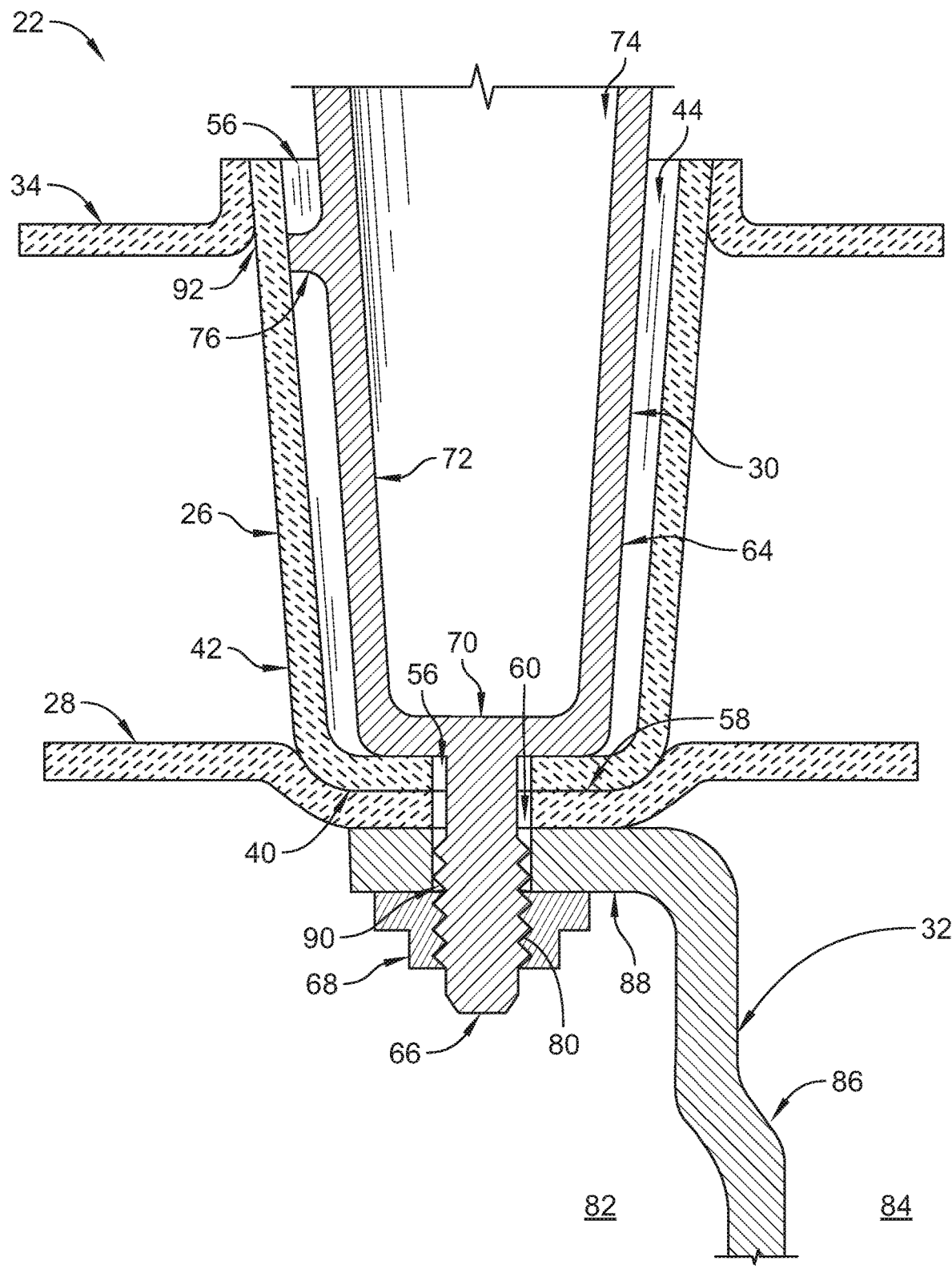
FIG. 4 is a section view of the turbine vane assembly of FIG. 2 showing that the spar is located in an interior region of the airfoil and includes a spar body and a spar tail that extends away from the spar body and through the radial-inner wall of the airfoil, the inner endwall, and the inner panel to couple the components together.

The airfoil 26 is formed to include a radial-inner wall 40 and a sidewall 42 that extends radially outward and away from a perimeter of the radial-inner wall 40 to define the interior region 44 of the airfoil 26 as shown in FIGS. 3 and 4. The spar 30 includes a spar body 64 and a spar tail 66. The spar body engages the radial-inner wall 40 of the airfoil 26 so that an interface between the spar 30 and the airfoil 26 is located radially inward toward the boundary of the primary gas path. The spar tail 66 extends radially inward away from the spar body 64 through the airfoil 26 and the endwall 28 to couple the spar 30 with the airfoil 26 and the inner endwall 28.

In illustrative embodiments, the turbine vane assembly 22 further includes an inner panel 32 and an outer endwall 34 as shown in FIGS. 3 and 4. The inner panel 32 is coupled to the spar tail 66 and is adapted to provide a seal between pressurized regions upstream and downstream of the inner panel 32. The outer endwall 34 is arranged around at least a portion of a radial outer end of the airfoil 26 to define another boundary of the primary gas path.

The gas turbine engine 10 is designed to include the turbine vane assembly 22 and includes a fan 12, a compressor 14, a combustor 16, and the turbine 18 as shown in FIG. 1. The compressor 14 compresses and delivers air to the combustor 16. The combustor 16 mixes fuel with the compressed air received from the compressor 14 and ignites the fuel. The hot, high-pressure gases from the burning fuel are directed into the turbine 18 where the turbine 18 extracts work from the gases to drive the compressor 14 and the fan 12. In other embodiments, the gas turbine engine 10 may include a shaft, turboprop, or gearbox in place of the fan 12.

The turbine 18 includes a plurality of turbine wheel assemblies 20 and turbine vane assemblies 22 as shown in FIG. 1. Each turbine wheel assembly 20 includes a disk and the plurality of turbine blades that extend radially away from the disk and interact with the hot combustion gases to rotate the turbine wheel assembly about the axis 11. Each turbine vane assembly 22 is located between neighboring turbine wheel assemblies 20 to direct the gases at the downstream turbine wheel assembly 20.

The turbine vane assembly 22 includes at least one airfoil 26, the inner endwall 28, the spar 30, the inner panel 32, and the outer endwall 34 as shown in FIG. 3. The airfoil 26 is shaped to direct the hot gases moving in the primary gas path toward a downstream turbine wheel assembly 20. The inner endwall 28 and the outer endwall 34 each define a boundary of the primary gas path. The spar 30 extends into the airfoil 26 to support the airfoil 26 and carry loads from the hot gases that act on the airfoil 26 during operation of the gas turbine engine 10. The inner panel 32 is coupled to the spar 30 and extends around the axis 11 and may extend around a central shaft of the engine 10 to provide a seal between pressurized regions of the turbine 18.

The airfoil 26 includes the radial-inner wall 40 and the sidewall 42 as shown in FIGS. 3 and 4. The sidewall 42 is formed to define an opening 54 at its radial outer end for receiving the spar 30. The radial-inner wall 40 closes a radial inner end of the sidewall 42.

The sidewall 42 is airfoil shaped and includes a leading edge 46, a trailing edge 48, a pressure side 50, and a suction side 52 as shown in FIG. 3. The radial-inner wall 40 extends axially between the leading edge 46 and the trailing edge 48 of the sidewall 42. The radial-inner wall 40 further extends circumferentially between the pressure side 50 and the suction side 52 of the sidewall 42. The sidewall 42 extends radially outward away from the radial-inner wall 40 and toward the outer endwall 34 such that the radial-inner wall 40 and the inner endwall define the interior region 44 of the airfoil 26.

The radial-inner wall 40 is formed to define an airfoil passageway 56 that extends radially through the radial-inner wall 40 as shown in FIG. 3. The airfoil passageway 56 opens into the interior region 44 of the airfoil 26. The airfoil passageway 56 is sized to receive at least a portion of the spar tail 66 while being sized such that the radial-inner wall 40 blocks the spar body 64 from passing radially inwardly through the airfoil passageway 56. Illustratively, the airfoil passageway 56 is circular when viewed radially. In other embodiments, the airfoil passageway is rectangular, oblong, oval, eccentric, or any other suitable alternative when viewed radially.

The airfoil 26 comprises ceramic matrix composite materials in the illustrative embodiment. In other embodiments, the airfoil 26 comprises metallic materials. Illustratively, the radial-inner wall 40 and the sidewall 42 are integrally formed. The sidewall 42 and the radial-inner wall 40 are solid in the illustrative embodiment. The sidewall 42 and the radial-inner wall 40 are formed entirely of ceramic matrix composite materials in the illustrative embodiment.

The inner endwall 28 extends circumferentially about the axis 11 as suggested in FIGS. 2 and 3. The inner endwall 28 is an annular full hoop member in the illustrative embodiment. In other embodiments, the inner endwall 28 is a segment that extends circumferentially partway about the axis and a plurality of endwall segments are arranged about the axis 11 to define the primary gas path boundary. The inner endwall 28 is formed to include a circumferentially extending depression 58 as shown in FIGS. 3 and 4. The depression is sized to receive the radial-inner wall 40 of the airfoil 26.

The inner endwall 28 is formed to define an endwall passageway 60 that extends radially through the inner endwall 28 as shown in FIGS. 3 and 4. The endwall passageway 60 aligns circumferentially and axially with the airfoil passageway 56. The endwall passageway 60 is sized to receive at least a portion of the spar tail 66. Illustratively, the endwall passageway 60 is circular when viewed radially. In other embodiments, the endwall passageway is rectangular, oblong, oval, eccentric, or any other suitable alternative when viewed radially.

The inner endwall 28 comprises ceramic matrix composite materials in the illustrative embodiment. In other embodiments, the inner endwall 28 comprises metallic materials. Illustratively, the inner endwall 28 and the airfoil 26 are formed as separate components. In other embodiments, the inner endwall 28 and the airfoil 26 are integrally formed. In such embodiments, the inner endwall 28 may act as the radial-inner wall 40 of the airfoil 26.

The spar 30 includes the spar body 64, the spar tail 66, and a retainer 68 as shown in FIGS. 3 and 4. The spar body 64 is located in the interior region 44 of the airfoil 26. The spar tail 66 extends radially inwardly away from the spar body 64 toward the axis 11. The retainer 68 is coupled to the spar tail 66 to block movement of airfoil 26 and the inner endwall 28 away from the spar body 64. Illustratively, the spar body 64 and the spar tail 66 are integrally formed. The spar 30 comprises metallic materials in the illustrative embodiment.

The spar body 64 includes an inner wall 70 and a spar sidewall 72 that extends radially outward away from the inner wall 70 to define a cavity 74 in the spar body 64 as shown in FIG. 4. The spar sidewall 72 extends radially outward beyond the outer radial end of the airfoil 26 as shown in FIG. 4. The inner wall 70 and the spar sidewall 72 are solid in the illustrative embodiment.

The spar body 64 further includes one or more load pads 76 that extend away from the spar sidewall 72 and engage an inner surface of the sidewall 42 of the airfoil 26. The inner wall 70 of the spar body 64 interfaces with the radial-inner wall 40 of the airfoil 26 to support a radial inner end of the airfoil 26. As such, the one or more load pads 76 are located radially toward the outer boundary of the primary gas path and radially away from the radial-inner wall 40 of the airfoil 26 to support a radial outer end of the airfoil 26. The ceramic airfoil 26 interfaces with the metallic spar body 64 toward the outer edges of the boundary of the primary gas path and away from a center of the primary gas path where the temperatures may be greatest.

The spar tail 66 extends radially away from the inner wall 70 of the spar 30 as shown in FIG. 4. The spar tail 66 extends radially through the radial-inner wall 40 of the airfoil 26 and the inner endwall 28 to couple the airfoil 26 and the inner endwall to the spar 30. As shown in FIG. 4, the spar tail 66 extends radially beyond the inner endwall 28 and beyond the inner panel 32. In some embodiments, the spar tail 66 is cylindrical shaped and includes threads 80 as shown in FIG. 4. In other embodiments, the spar tail 66 may be other suitable shapes as suggested in FIG. 5.

Aero loads acting on the airfoil 26 may be reacted through the inner wall of the airfoil 26 through the spar tail 66. For example, aero loads may act on the sidewall 42 and be transmitted to the radial-inner wall 40 of the airfoil 26. The radial-inner wall 40 transmits the loads to the spar tail 66 around the airfoil passageway 56 which is formed in the radial-inner wall 40 at a known location. Managing the contact between the airfoil 26 and the spar tail 66 in such a way may locate the components on a machined hole in the ceramic matrix composite and may result in a gap between the spar 30 and the airfoil 26 around the spar 30 except in locations where load pads 76 are used.

The retainer 68 is coupled to the spar tail 66 and illustratively includes a nut that is threaded so as to mate with the threads 80 of the spar tail 66. In other embodiments, the retainer 68 includes one or more of a nut, bolt, pin, and snap ring. The retainer 68 cooperates with the spar body 64 to clamp the radial-inner wall 40, the inner endwall 28, and the inner panel 32 between the spar body 64 and the retainer 68.

The inner panel 32 is arranged circumferentially around the axis 11 and is adapted to block fluid communication between a pressurized region 82 located axially upstream of the inner panel 32 and a pressurized region 84 located axially downstream of the inner panel 32 as suggested in FIG. 4. The inner panel 32 is coupled with the spar tail 66 and the inner panel 32 is spaced apart radially from the spar body 64 to locate the radial-inner wall 40 and the inner endwall 28 radially between the spar body 64 and the inner panel 32.

The inner panel 32 is an annular full hoop member that extends around the axis 11 in the illustrative embodiment. In other embodiments, the inner panel 32 may be a segment that extends circumferentially partway around the axis 11.

The inner panel 32 includes a body 86 and a flange 88 that extends axially away from the body 86 as shown in FIG. 4. The flange 88 is formed to define a plurality of panel passageway 90 that each extends radially through the flange 88. The spar tail 66 extends radially through one of the panel passageways 90 to couple the inner panel 32 with the spar 30. The panel passageway 90 aligns circumferentially and axially with the airfoil passageway 56. The panel passageway 90 is sized to receive at least a portion of the spar tail 66. Illustratively, the panel passageway 90 is circular when viewed radially. In other embodiments, the panel passageway is rectangular, oblong, oval, eccentric, or any other suitable alternative when viewed radially.

The outer endwall 34 is arranged around the airfoil 26 at the radial outer end of the airfoil 26 as shown in FIG. 4. The outer endwall 34 defines the outer radial boundary of the primary gas path. The outer endwall 34 is formed to define a plurality of holes 92 each hole 92 shaped to receive a portion of one of the airfoils 26. In some embodiments, the outer endwall 34 and the airfoil 26 are integrally formed. The outer endwall 34 comprises ceramic matrix composite materials in the illustrative embodiment. In other embodiments, the outer endwall 34 comprises metallic materials.

In accordance with the present disclosure, a method may include a number of steps. The method may include providing the airfoil 26 that comprises ceramic materials, one of the endwalls 28, 34, and the spar 30 that comprises metallic materials. The method includes locating the spar body 64 in the interior region 44 of the airfoil 26 such that the spar tail 66 extends through the airfoil passageway 56. The method may include moving the endwall 28, 34 relative to the spar 30 such that the spar tail 66 extends through the endwall passageway 60.

The method may further include providing the inner panel 32 and coupling the inner panel 32 to the spar tail 66 to locate the radial-inner wall 40 and the endwall 28 radially between the spar body 64 and a portion of the inner panel 32. The method may include providing a second endwall 28, 34 and locating the second endwall 28, 34 around a portion of the airfoil 26 and in radial spaced apart relation relative to the first endwall 28, 34.

Figure 5:
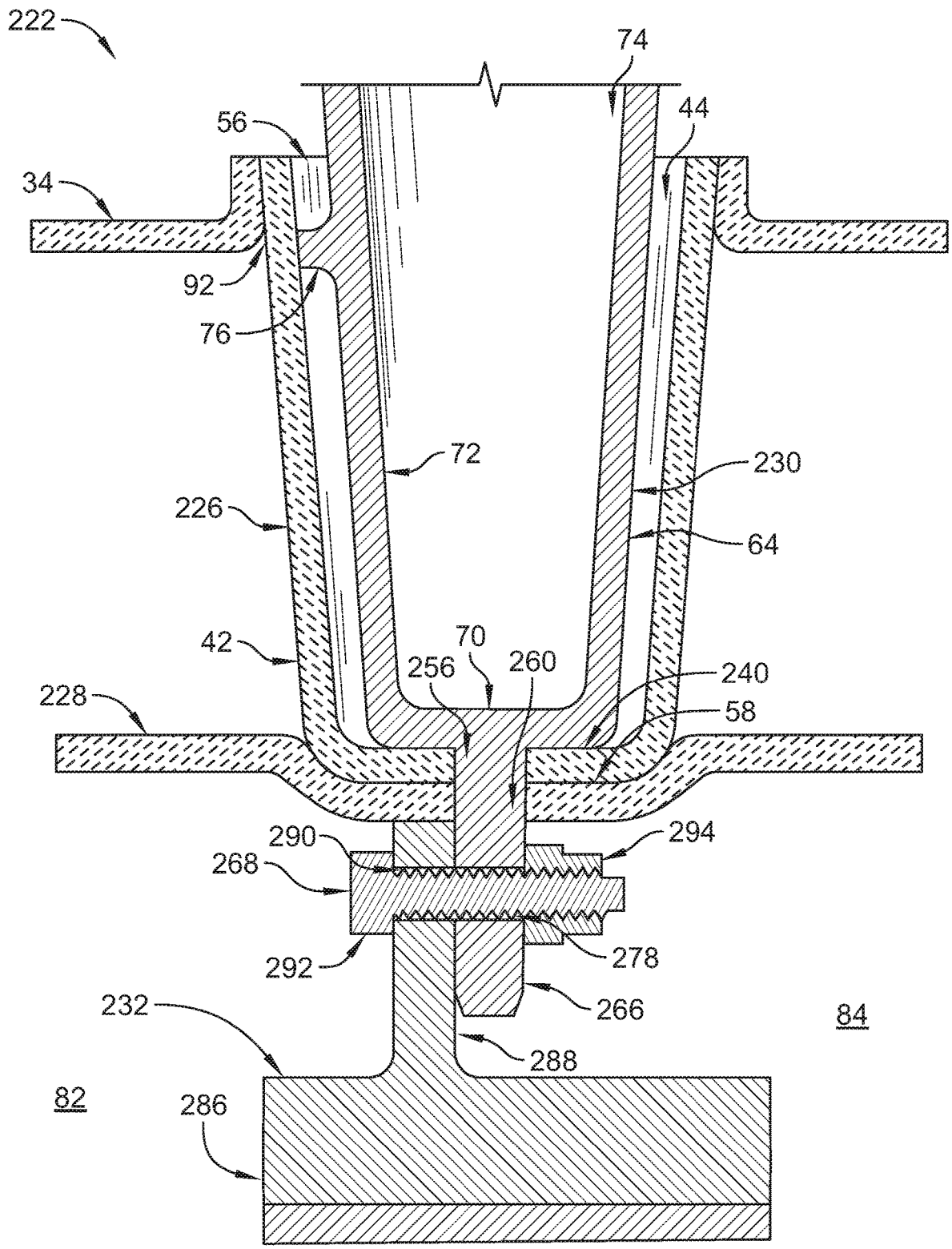
FIG. 5 is a section view of another turbine vane assembly adapted for use in the gas turbine engine of FIG. 1 showing that the spar includes a spar body and a spar tail that extends through the radial-inner wall of the airfoil and the inner endwall and that the inner panel is fastened with the spar tail to block movement of the airfoil and inner endwall.

Another embodiment of a turbine vane assembly 222 in accordance with the present disclosure is shown in FIG. 5. The turbine vane assembly 222 is substantially similar to the turbine vane assembly 22 shown in FIGS. 1-4 and described herein. Accordingly, similar reference numbers in the 200 series indicate features that are common between the turbine vane assembly 22 and the turbine vane assembly 222. The description of the turbine vane assembly 22 is incorporated by reference to apply to the turbine vane assembly 222, except in instances when it conflicts with the specific description and the drawings of the turbine vane assembly 222.

The turbine vane assembly 222 includes an airfoil 226, an inner endwall 228, a spar 230, an inner panel 232, and the outer endwall 34 as shown in FIG. 5. As discussed in greater detail below, the spar 230 includes a spar tail 266 formed to define a spar passageway 278 and a retainer 268 that extends into the spar passageway 278 and an endwall passageway 260 formed in the inner endwall 228 to couple the airfoil 226 and the inner endwall 228 to the spar 230.

The airfoil 226 includes a radial-inner wall 240 and the sidewall 42 that extends away from the radial-inner wall 240 to define the interior region 44 as shown in FIG. 5. The radial-inner wall 240 is formed to define an airfoil passageway 256 that extends radially through the radial-inner wall 240. The airfoil passageway 256 is shaped to receive the spar tail 266 of the spar 230. The airfoil passageway 256 is rectangular when viewed radially and may include rounded corners.

The inner endwall 228 is formed to define the endwall passageway 260 that extends radially through the inner endwall 228 as shown in FIG. 5. The endwall passageway 260 is shaped to receive the spar tail 266 of the spar 230. The endwall passageway 260 is rectangular when viewed radially and may include rounded corners.

The spar 230 includes the spar body 64 and the spar tail 266 that extends radially away from the spar body 64 as shown in FIG. 5. The spar tail 266 is rectangular shaped when viewed radially in the illustrative embodiment. As a result, the axial faces of the spar tail 266 are planar. The circumferential faces of the spar tail 266 may be planar or rounded in some embodiments. The spar tail 266 is formed to include the spar passageway 278 that extends axially through the spar tail 266.

The spar tail 266 extends radially through the airfoil passageway 256 and the endwall passageway 260 as shown in FIG. 5. The spar further includes the retainer 268 which includes a bolt 292 and a nut 294. The bolt 292 extends through the spar passageway 278 to block radial movement of the airfoil 226 and the inner endwall 228 relative to the spar 230. The nut 294 is coupled to an end of the bolt 292. In other embodiments, the retainer 268 includes a pin.

The inner panel 232 includes a body 286 and a flange 288 as shown in FIG. 5. The body 286 is arranged around the axis 11 and the flange extends radially away from the body 286. The flange 288 is formed to define a panel passageway 290 that extends axially through the flange 288. The bolt 292 included in the retainer 268 extends through the panel passageway 290 to couple the inner panel 232 to the spar 230.

The present disclosure may aid in the introduction of ceramic matrix composite materials into the turbine 18 of the gas turbine engine 10. Using ceramic matrix composite materials in the turbine 18 may allow the reduction of cooling air usage, an increase in turbine entry temperatures, weight savings, and an overall increase in turbine efficiency.

The turbine vane assembly 22 may include ceramic matrix composite airfoils 26, ceramic matrix composite endwalls 28, 34, and metallic support structures 30. In some embodiments, the turbine vane assembly 22 includes a plurality of ceramic matrix composite airfoils 26 (with or without an integral outer endwall), a plurality of inner endwalls 28, a plurality of spars 30, a full-hoop interstage seal panel 32, and a plurality of retainer features 68.

The spar 30 may be hollow and may include a feature 66 that protrudes radially inward and includes the ability to retain and position other components. The airfoil 26 is hollow, slips over the spar 30, and includes a hole 56 in the bottom of the airfoil 26 that the spar retention feature 66 protrudes through. The endwall 28 may be a separate piece that is installed in contact with an inner surface of the airfoil 26 and is positioned by the spar feature 66. The turbine vane assemblies 22 are then installed to the inner seal panel 32 using the radially inward feature 66 on the spar 30 to position the assemblies and a retaining 68 feature such as a nut, snap ring, or retaining pin is installed to clamp the assembly together. This entire assembly may be loaded into the engine 10 as a vane row assembly.

The vane 26 may be radially positioned by the inner surface of the spar 30. The hole 56, 60 in the bottom of the vane airfoil/endwall 26, 28 can also be used to locate/space the spar 30 and the inner wall of the airfoil 26 with respect to each other. This may be used to maintain a gap in the components near the center span. This may drive the contact between the ceramic matrix composite airfoil 26 and the metallic support structure 30 outside of the flow path region which may reduce chemical interaction concerns between the two components. In other embodiments, the inner endwall 28 is integral with the vane airfoil 26.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine vane assembly adapted for use in a gas turbine engine, the turbine vane assembly comprising
an airfoil comprising ceramic matrix composite materials and shaped to interact with hot gases moving axially along a primary gas path of the gas turbine engine relative to an axis, the airfoil formed to include a radial-inner wall and a sidewall that extends radially outward and away from a perimeter of the radial-inner wall to define an interior region of the airfoil, and the radial-inner wall formed to define an airfoil passageway that extends radially through the radial-inner wall and opens into the interior region,
an endwall comprising ceramic matrix composite materials and shaped to define a boundary of the primary gas path near a radial end of the airfoil and the endwall formed to define an end-wall passageway that extends radially through the endwall, and
a spar comprising metallic materials and located in the interior region of the airfoil to carry loads that act on the airfoil, the spar including a spar body that engages the radial-inner wall of the airfoil so that an interface between the spar and the airfoil is located radially inward toward the boundary of the primary gas path, a spar tail that extends radially inward away from the spar body through the airfoil passageway and the end-wall passageway, and a retainer coupled to the spar tail to block movement of the radial-inner wall and the endwall away from the spar body.

2. The turbine vane assembly of claim 1, further comprising an inner panel arranged around the axis and adapted to block fluid communication between a pressurized region located axially upstream of the inner panel and a pressurized region located axially downstream of the inner panel, the inner panel is coupled with the spar tail, and the inner panel is spaced apart radially from the spar body to locate the radial-inner wall and the endwall radially between the spar body and the inner panel.

3. The turbine vane assembly of claim 2, wherein the inner panel is formed to define a panel passageway that extends through the inner panel and the spar tail extends through the panel passageway such that a portion of the inner panel is located between the spar body and the retainer.

4. The turbine vane assembly of claim 2, wherein the inner panel includes a body and a flange that extends radially outward away from the body, the flange is formed to define a panel passageway that extends axially through the flange, and the retainer extends through the panel passageway to couple the inner panel with the spar tail.

5. The turbine vane assembly of claim 2, wherein the spar tail extends radially inward through and beyond the endwall and the inner panel.

6. The turbine vane assembly of claim 1, wherein the spar tail has threads and the retainer is threaded and mates with the threads of the spar tail.

7. The turbine vane assembly of claim 6, wherein the airfoil passageway is circular when viewed radially.

8. The turbine vane assembly of claim 6, further comprising an outer-endwall spaced apart radially from the endwall and shaped to define another boundary of the primary gas path near another radial end of the airfoil.

9. The turbine vane assembly of claim 1, wherein the spar tail is formed to define a spar passageway that extends at least partway into the spar tail and the retainer extends into the spar passageway.

10. A turbine vane assembly comprising
an airfoil that includes a radial-inner wall formed to define an airfoil passageway that extends radially through the radial-inner wall relative to an axis and a sidewall that extends radially away from the radial-inner wall to define an interior region of the airfoil,
an endwall formed to define an end-wall passageway that extends radially through the endwall, and
a spar that includes a spar body located in the interior region of the airfoil and a spar tail that extends radially inward away from the spar body toward the axis and through the airfoil passageway and the end-wall passageway,
wherein the airfoil passageway is formed in the radial-inner wall of the airfoil at a predetermined location, the sidewall is spaced apart from the spar body to define a gap therebetween, and the spar tail engages the radial-inner wall of the airfoil in the airfoil passageway such that at least a portion of aero loads acting on the airfoil are transmitted through the radial-inner wall at the predetermined location to the spar tail during use of the turbine vane assembly.

11. The turbine vane assembly of claim 10, further comprising an inner panel arranged at least partway around the axis and coupled with the spar tail.

12. The turbine vane assembly of claim 11, wherein the inner panel is spaced apart radially from the spar body to locate the radial-inner wall and the endwall radially between the spar body and the inner panel.

13. The turbine vane assembly of claim 11, wherein the inner panel is formed to define a panel passageway that extends through the inner panel and the spar tail extends through and beyond the panel passageway.

14. The turbine vane assembly of claim 11, wherein the inner panel includes a body arranged at least partway around the axis and a flange that extends radially outward away from the body, the flange is formed to define a panel passageway that extends axially through the flange, and the spar further includes a retainer that extends through the flange to couple the inner panel with the spar tail.

15. The turbine vane assembly of claim 10, wherein the spar tail has threads.

16. The turbine vane assembly of claim 10, wherein the spar tail is formed to define a spar passageway that extends at least partway into the spar tail and the spar includes a retainer that extends into the spar passageway.

17. A method comprising providing an airfoil that comprises ceramic materials, a first endwall, and a spar that comprises metallic materials, the airfoil includes a radial-inner wall formed to define an airfoil passageway that extends radially through the radial-inner wall relative to an axis and a sidewall that extends radially away from the radial-inner wall to define an interior region of the airfoil, the first endwall formed to define an end-wall passageway that extends radially through the first endwall, and the spar includes a spar body and a spar tail that extends radially away from the spar body, and the spar tail is further formed to define a spar passageway that extends at least partway into the spar tail, locating the spar body in the interior region of the airfoil such that the spar tail extends through the airfoil passageway, moving the first endwall relative to the spar such that the spar tail extends through the end-wall passageway, and inserting a retainer into the spar passageway to couple the airfoil, the end wall, and the spar together.

18. The method of claim 17, further comprising providing an inner panel and coupling the inner panel to the spar tail to locate the radial-inner wall and the first endwall radially between the spar body and a portion of the inner panel.

19. The method of claim 18, further comprising providing a second endwall and locating the second endwall around a portion of the airfoil and in radial spaced apart relation relative to the first endwall.

* * * * *